(12) United States Patent
Hertlein et al.

(10) Patent No.: US 8,600,374 B1
(45) Date of Patent: Dec. 3, 2013

(54) STERILIZABLE WIRELESS TRACKING AND COMMUNICATION DEVICE AND METHOD FOR MANUFACTURING

(75) Inventors: Robert Hertlein, San Diego, CA (US);
Gary Jorgensen, San Diego, CA (US);
Patrick O'Bright, San Diego, CA (US);
Matthew R. Perkins, San Diego, CA (US)

(73) Assignee: Awarepoint Corporation, San Diego, CA (US)

(*) Notice: Subject to any disclaimer, the term of this patent is extended or adjusted under 35 U.S.C. 154(b) by 0 days.

(21) Appl. No.: 13/371,416

(22) Filed: Feb. 11, 2012

Related U.S. Application Data

(60) Provisional application No. 61/442,154, filed on Feb. 11, 2011.

(51) Int. Cl.
*H04W 88/02* (2009.01)

(52) U.S. Cl.
USPC ........................................................ 455/425

(58) Field of Classification Search
USPC ............... 455/425, 575.1; 381/386; 361/816; 340/445
See application file for complete search history.

(56) References Cited

U.S. PATENT DOCUMENTS

| | | | | |
|---|---|---|---|---|
| 6,255,949 B1* | 7/2001 | Nicholson et al. | ......... | 340/572.8 |
| 6,827,913 B2* | 12/2004 | Wood | ............. | 422/300 |
| 7,118,029 B2* | 10/2006 | Nycz et al. | ............... | 235/375 |
| 7,312,752 B2* | 12/2007 | Smith et al. | ............... | 342/464 |
| 7,324,824 B2* | 1/2008 | Smith et al. | ............... | 455/456.1 |
| 7,443,297 B1* | 10/2008 | Baranowski et al. | ...... | 340/572.1 |
| 7,504,928 B2* | 3/2009 | Nierenberg et al. | ......... | 340/10.3 |
| 7,636,046 B2* | 12/2009 | Caliri et al. | ............... | 340/572.1 |
| 7,701,334 B1* | 4/2010 | Perkins et al. | ........... | 340/539.13 |
| 7,941,096 B2* | 5/2011 | Perkins et al. | ............... | 455/41.2 |
| 8,040,238 B2* | 10/2011 | Perkins | .................... | 340/539.13 |
| 2005/0254778 A1* | 11/2005 | Pettersen et al. | ................ | 386/46 |
| 2006/0031099 A1* | 2/2006 | Vitello et al. | ..................... | 705/2 |
| 2008/0012767 A1* | 1/2008 | Caliri et al. | .................... | 342/463 |
| 2011/0227722 A1* | 9/2011 | Salvat, Jr. | ................. | 340/539.1 |

* cited by examiner

*Primary Examiner* — Diane Mizrahi
(74) *Attorney, Agent, or Firm* — Clause Eight IPS; Michael Catania

(57) ABSTRACT

The present invention is a wireless communication device which includes a circuit board with a coating, a top housing, a bottom housing and a gasket. The wireless communication device is preferably a water-tight enclosure. A method for forming a water-proof wireless communication device is also disclosed.

19 Claims, 22 Drawing Sheets

STERILIZABLE WIRELESS TRACKING AND COMMUNICATION DEVICE AND METHOD FOR MANUFACTURING

CROSS REFERENCES TO RELATED APPLICATIONS

The Present Application claims priority to U.S. Provisional Patent Application No. 61/442,154, filed Feb. 11, 2011, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking and communication devices and methods for manufacturing wireless communication devices. More specifically, the present invention is related to sterilizable wireless tracking and communication devices and methods for manufacturing sterilizable wireless communication devices.

2. Description of the Related Art

The ability to quickly determine the location of objects located within a facility is becoming a necessity of life. To the uninformed observer, the placement of transponders, also known as tags, on numerous non-stationary objects whether in an office or home would appear to be an unnecessary use of resources. However, the uninformed observer fails to appreciate the complexity of modern life and the desire for efficiency, whether at the office or home.

For example, in a typical hospital there are numerous shifts of employees utilizing the same equipment. When a new shift arrives the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects, each of which transmits a signal, multiple receivers for receiving the transmissions from the tagged objects, and a processing means for analyzing the transmissions to determine the locations of the tagged objects within a predetermined environment.

Medical equipment subject to extreme temperatures includes surgical kits or surgical trays which are typically sterilized in an autoclave at high temperatures to destroy any living organisms (bacteria, fungi, viruses and spores). Autoclaves generally use heat and high pressure to destroy the living organisms. These high temperatures are often in excess of 120 degrees Fahrenheit, and as high as 300 degrees Fahrenheit.

The surgical trays are typically composed of stainless steel, aluminum or another metal. Various surgical instruments are contained within the surgical tray. An example of such a tray is disclosed in Wood, U.S. Pat. No. 6,827,913, for a Modular Sterilization Tray Systems For Medical Instruments.

The autoclave sterilization temperatures are far beyond the typically room temperature operating ranges for most RFID tags or similar wireless tracking tags. However, there is a need to track the location of the surgical trays since the ability to monitor the location and the sterilization status of such surgical trays allows a hospital or other like facility to adequately prepare for a surgery procedure.

Nycz, et al., U.S. Pat. No. 7,118,029, for a Smart Instrument Tray RFID Reader, discloses the use of passive RFID tags that are attached to surgical instruments to provide information on the contents of a surgical tray. The RFID tags can be encased in such materials as Phenol, Glass, Wood, Epoxy resin, Silicon, Rubber, Polyvinyl Chloride, Acrylonitrile Butadiene Styrene, common plastic and Styrofoam.

Nicholson, et al., U.S. Pat. No. 6,255,949, for a High Temperature RFID Tag, discloses an RFID tag that is capable of withstanding temperatures of −40 degrees Celsius to 300 degrees Celsius. The tag is placed within a housing composed of a high thermally resistant material such as RYTON PPS compound or TEFLON.

Although the prior art has provided numerous solutions, the prior art has failed to recognize the problems associated with wireless location asset tracking in a sterilization environment.

BRIEF SUMMARY OF THE INVENTION

The present invention has recognized that operating a wireless tracking system in a sterilization environment creates unique problems. The present invention provides a novel solution to that problem in the form of a water-proof sterilizable tag.

One aspect of the present invention is a wireless communication device comprising a circuit board with a coating, a top housing having a protrusion, a bottom housing for engagement with the top housing, the bottom housing having a side wall, and a gasket with a designed interference for sealing a chamber defined by the top housing and the bottom housing. The circuit board is positioned within the chamber and the protrusion of the top housing and the side wall of the bottom housing form a vapor trap.

Another aspect of the present invention is a wireless communication device comprising a circuit board with a paralyne coating, a top housing having a protrusion extending downward, a bottom housing for engagement with the top housing, the bottom housing having a side wall, and a TPE gasket with a designed interference for sealing a chamber defined by the top housing and the bottom housing. The circuit board is positioned within the chamber and the protrusion of the top housing and the side wall of the bottom housing form a vapor trap.

Another aspect of the present invention is a method for forming a water-proof wireless communication device. The method includes coating a circuit board with a coating material to form a coated circuit board. The method also includes placing a gasket around the coated circuit board. The method also includes placing the coated circuit board and gasket in a bottom housing. The method also includes mating a top housing with the bottom housing. The method also includes attaching the top housing with the bottom housing to form a water-proof wireless communication device.

Another aspect of the present invention is a tag for real-time location monitoring of a sterilizable object. The tag includes a circuit board with a paralyne coating, a top housing having a protrusion extending downward, a bottom housing for engagement with the top housing, the bottom housing having a side wall, and a TPE gasket with a designed interference for sealing a chamber defined by the top housing and the bottom housing. The circuit board is positioned within the chamber and the protrusion of the top housing and the side wall of the bottom housing form a vapor trap.

The housing is preferably composed of a polyetherimide resin material.

The tracking tag preferably transmits a radiofrequency transmission of approximately 2.48 GigaHertz, and each of the plurality of network sensors communicates utilizing an 802.15.4 protocol. Alternatively, the tracking tag transmits an ultrasound or infrared transmission.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
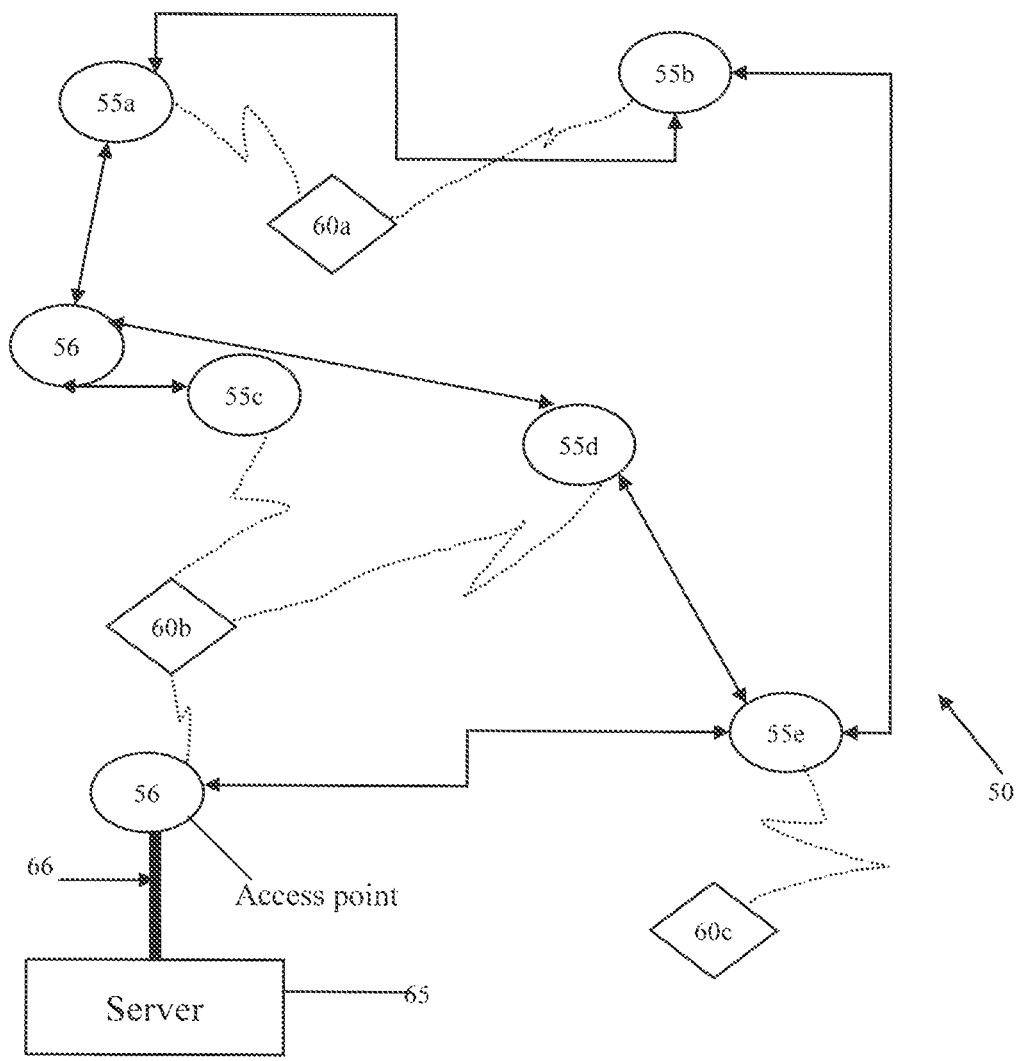
FIG. 1 is schematic view of a wireless asset tracking system.
Figure 2:
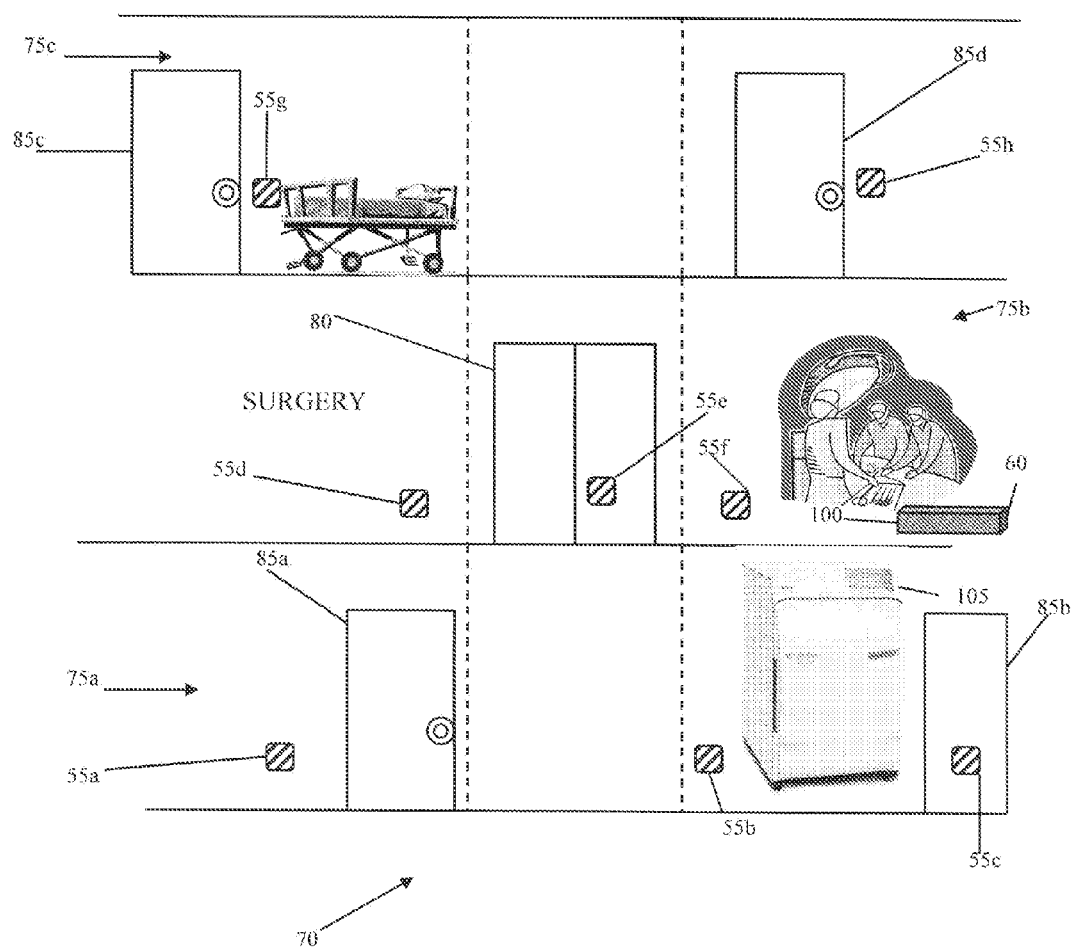
FIG. 2 is a multi-floor view of a facility employing a wireless asset tracking system.

As shown in FIGS. 1-2, a wireless asset tracking system is generally designated 50. The system 50 is capable of determining real-time location of a sterilizable object 100 within a facility 70, and is particularly useful for tracking a sterilizable object 100 that sterilized in a sterilization area of the facility 70. The system 50 preferably includes a plurality of sensors 55, a plurality of bridges 56, a plurality of tags 60 and at least one server 65. One example of the components of the system 50 is disclosed in Smith et al., U.S. Pat. No. 7,312,752 for a Wireless Position Location And Tracking System, which is hereby incorporated by reference in its entirety. A more specific example of the sensors 55 is disclosed in Smith et al., U.S. Pat. No. 7,324,824 for a Plug-In Network Appliance, which is hereby incorporated by reference in its entirety.

The system 50 is preferably employed within a facility 70 such as a hospital, healthcare facility, or other like facility. The system 50 is utilized to track and locate various sterilizable objects 100 positioned throughout the facility 70. The tags 60 preferably continuously transmit signals on a predetermined time cycle, and these signals are received by the sensors 55 positioned throughout the facility 70. Alternatively, the tags 60 transmit signals in a random, ad-hoc or dynamic manner, and these signals are received by the sensors 55 positioned throughout the facility 70. In a preferred embodiment, the tags 60 transmit a signal every five seconds when in motion, and a signal every ten minutes when stationary. The sensors 55 preferably transmit the data to a bridge 56 for transmission to a server 65. If a sensor 55 is unable to transmit to a bridge 56, the sensor 55 may transmit to another sensor 55 in a mesh network-like system for eventual transmission to a bridge 56. In a preferred embodiment, a transmission can be relayed from a sensor 55 to a bridge 56 up to a transmission distance of six sensors 55 from the bridge 56. The server 65 preferably continuously receives transmissions from the sensors 55 via the bridges 56 concerning the movement of assets 100 bearing a tag 60 within the facility 70. The server 65 processes the transmissions from the sensors 55 and calculates a real-time position for each of the assets 100 bearing a tag 60 within the facility 70. The real-time location information for each of the assets 100 bearing a tag 60 is preferably displayed on an image of a floor plan of the indoor facility 70, or if the facility 70 has multiple floors, then on the floor plan images of the floors of the facility 70. The floor plan image may be used with a graphical user interface so that an individual of the facility 70 is able to quickly locate assets 100 within the facility 70.

Figure 3:
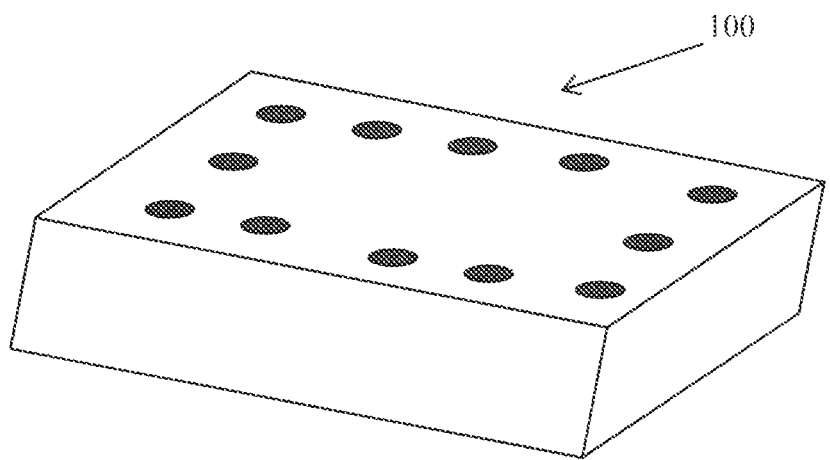
FIG. 3 is an illustration of a surgical tray.
Figure 3A:
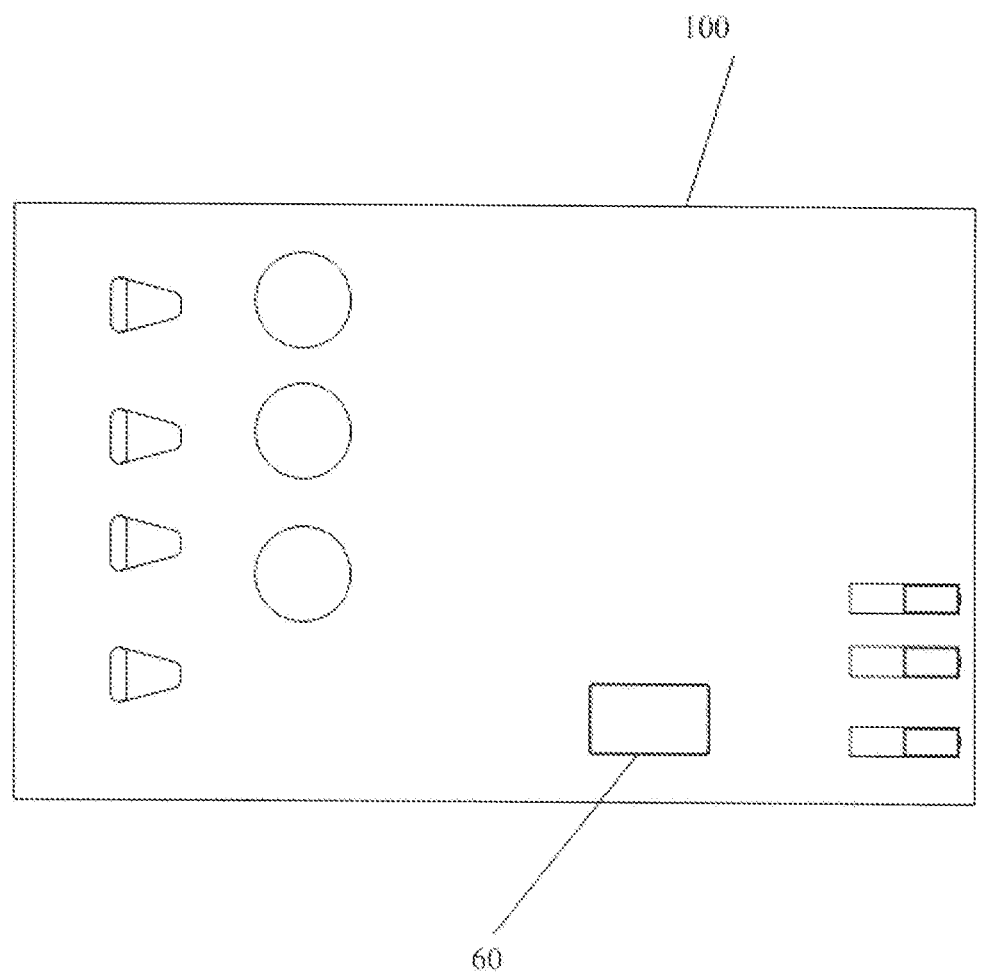
FIG. 3A is an illustration of an interior of a surgical tray.

The sterilizable objects 100 are preferably items of value to the owners or users of the system 50 and/or the facility 70. In a hospital setting, the sterilizable objects 100 could include surgical equipment, nursing equipment and the like. In particular for the present invention, the sterilizable objects 100 include surgical trays which preferably contain surgical instruments, such as shown in FIGS. 3 and 3A. Sterilization is generally defined as a process which achieves the complete killing of all microorganisms, especially bacterial spores. As used herein, sterilization is defined in a broader sense to include cleaning, disinfecting and/or sterilizing.

Referring again to FIG. 1, the system 50 utilizes sensors 55 to monitor and identify the real-time position sterilizable objects 100 bearing or integrated with tags 60. The sensors 55a-f preferably wirelessly communicate with each other (shown as double arrow lines) and with a server 65 through a wired connection 66 via at least one bridge 56, such as disclosed in the above-mentioned U.S. Pat. No. 7,324,824 for a Plug-In Network Appliance. The tags 60a-c transmit signals (shown as dashed lines) which are received by the sensors 55a-e, which then transmit signals to bridges 56 for eventual transmission to a server 65. The server 65 is preferably located on-site at the facility 70. However, the system 50 may also include an off-site server 65, not shown.

Each tag 60, or wireless communication device, preferably transmits a radio frequency signal. Each device preferably uses a low-power, medium-range (1 foot to 30 feet) wireless communication system. Such wireless communication systems include ZIGBEE, BLUETOOTH, Low-Power BLUETOOTH, WiFi or Low-Power WiFi, Ultra Wide Band ("UWB"), Ultrasound and Infrared communication systems. A preferred radio-frequency signal is approximately 2.48 GigaHertz ("GHz"). The communication format is preferably IEEE Standard 802.15.4. Those skilled in the pertinent art will recognize that the tags 60 may operate at various frequencies without departing from the scope and spirit of the present invention. The tags 60 may be constructed with an asset theft protection system such as disclosed in Baranowski et al., U.S. Pat. No. 7,443,297 for a Wireless Tracking System And Method With Optical Tag Removal Detection, which is hereby incorporated by reference in its entirety. The tags 60 and near-field communication devices 59 may be designed to avoid multipath errors such as disclosed in Nierenberg et al., U.S. Pat. No. 7,504,928 for a Wireless Tracking System And Method Utilizing Tags With Variable Power Level Transmissions, and Caliri et al., U.S. Patent Publication Number 2008/0012767 for a Wireless Tracking System And Method With Multipath Error Mitigation, both of which are hereby incorporated by reference in their entireties.

A description of sterilizable tags 60 and systems using sterilizable tags is found in Caliri et al., U.S. Pat. No. 7,636,046 for Wireless Tracking System And Method With Extreme Temperature Resistant Tag, which is hereby incorporated by reference in its entirety. Another description of a sterilizable tag 60 and systems using sterilizable tags is found in Perkins et al., U.S. Pat. No. 7,701,334 for Wireless Tracking System And Method For Sterilizable Object, which is hereby incorporated by reference in its entirety. In another embodiment, the tags 60, or wireless communication devices, are used with or as near-field communication devices such as disclosed in Perkins, U.S. Pat. No. 7,941,096 for Wireless Tracking System And Method Utilizing Near-Field Communication Devices, which is hereby incorporated by reference in its entirety. In another embodiment, the tags 60, or wireless communication devices, are used with or as back-hauling communication devices such as disclosed in Perkins, U.S. Pat. No. 8,040,238 for Wireless Tracking System And Method For Backhaul Of Information, which is hereby incorporated by reference in its entirety.

As shown in FIG. 2, the facility 70 depicted is a hospital. The facility 70 has a multitude of floors 75a-c. An elevator 80 provides access between the various floors 75a, 75b and 75c. Each floor 75a, 75b and 75c has a multitude of rooms 90a-i, with each room 90 accessible through a door 85. Positioned throughout the facility 70 are sensors 55a-o for obtaining readings from tags 60a-d attached to or integrated into non-stationary assets 100. A bridge 56 is also shown for receiving transmissions from the sensors 55 for processing by the server 65. Specifically, a surgical tray 100 is used in surgery. A tag 60 is placed inside the tray 100 in order to track the tray within the facility. The tray 100 is sent to an autoclave 105 on a lower floor of the facility for sterilization subsequent to the surgery procedure. The movement of the tray 100 is tracked by the tag 60 and the tracking system 50 of the present invention.

As shown in FIGS. 6-9, a most preferred embodiment of a sterilizable wireless communication device, or tag, is designated 1000. The tag 1000 is preferably utilized as discussed above in reference to tag 60. The tag 1000 preferably comprises a bottom housing 1010, a top housing 1020, a circuit board 1030 and a gasket 1040. The bottom housing 1010 preferably has a slot 1011 for mating with an extension 1022 of the top housing 1020. The top housing 1020 also has a protrusion 1021 which forms a vapor trap to prevent the passage of water vapor that passes through the ultrasonic welds between the top housing 1020 and the bottom housing 1010. The circuit board 1030 is preferably coated in a coating material.

The housing for the wireless communication device 1000 is preferably composed of at least one material of an amorphous thermoplastic polyetherimide, an acrylonitrile butadiene styrene (ABS) material, or a polycarbonate material. A preferred amorphous thermoplastic polyetherimide is ULTEM® from Sabic. A preferred polycarbonate material is LEXAN®, also from Sabic. Those skilled in the pertinent art will recognized that other materials may be used for the housing without departing from the scope and spirit of the present invention.

The coating material is preferably is at least one of a paralyne coating, a silicone coating, an acrylic coating or a rubber coating. A most preferred coating is a paralyne coating. Those skilled in the pertinent art will recognized that other coatings may be used without departing from the scope and spirit of the present invention.

The gasket is preferably composed of at least one of silicone, acrylic, a thermoplastic elastomer or rubber. A most preferred material for the gasket is a thermoplastic elastomer. Those skilled in the pertinent art will recognized that other materials may be used for the gasket without departing from the scope and spirit of the present invention.

A preferred combined double shear weld and energy director creates a melt front on threes surfaces to form a water-tight enclosure 1000. The extended protrusion 1021 of the top housing 1020 has an interleaved design and creates a narrow passage for any water vapor that might get past the ultrasonic welds between the top housing 1020 and the bottom housing 1010. The gasket 1040 is preferably a low cost easily moldable and flat design, which allows the gasket 1040 to be compressed between the top housing 1020 and the bottom housing 1010 with an interference fit. The ultrasonic weld, extended protrusion and gasket creates a water tight seal and prevents water contact to the printed circuit board 1030 assembly, which would result in the erosion of the coating during an ultrasonic bath used to sterilize an object to which the tag 1000 is attached for tracking. The coating prevents any water molecule (liquid or gaseous) from shorting the electrical circuitry. The housing 1010 preferably has dimensions of a width ranging from 0.1 inch to 3.0 inches, a length ranging from 0.25 inch to 4.0 inches, and a thickness ranging from 0.05 inch to 2.0 inches. However, those skilled in the pertinent art will recognize that the housing 1010 is dimensioned to accommodate the necessary components of a wireless communication device while providing protection from water and water vapor during sterilization.

A method for forming a water-proof wireless communication device 1000 includes coating a circuit board with a coating material to form a coated circuit board. The coating is preferably a paralyne coating. Preferably the entire circuit board is coated in the coating material. Coating methods include dipping, spraying, brushing and like methods to apply the coating material to the circuit board without damaging the circuit board. The method also includes placing a gasket around the coated circuit board. The method also includes placing the coated circuit board and gasket in a bottom housing. The method also includes mating a top housing with the bottom housing. The method also includes attaching the top housing with the bottom housing to form a water-proof wireless communication device. Attaching the top housing with the bottom housing is preferably performed by ultrasonic welding.

Figure 4:
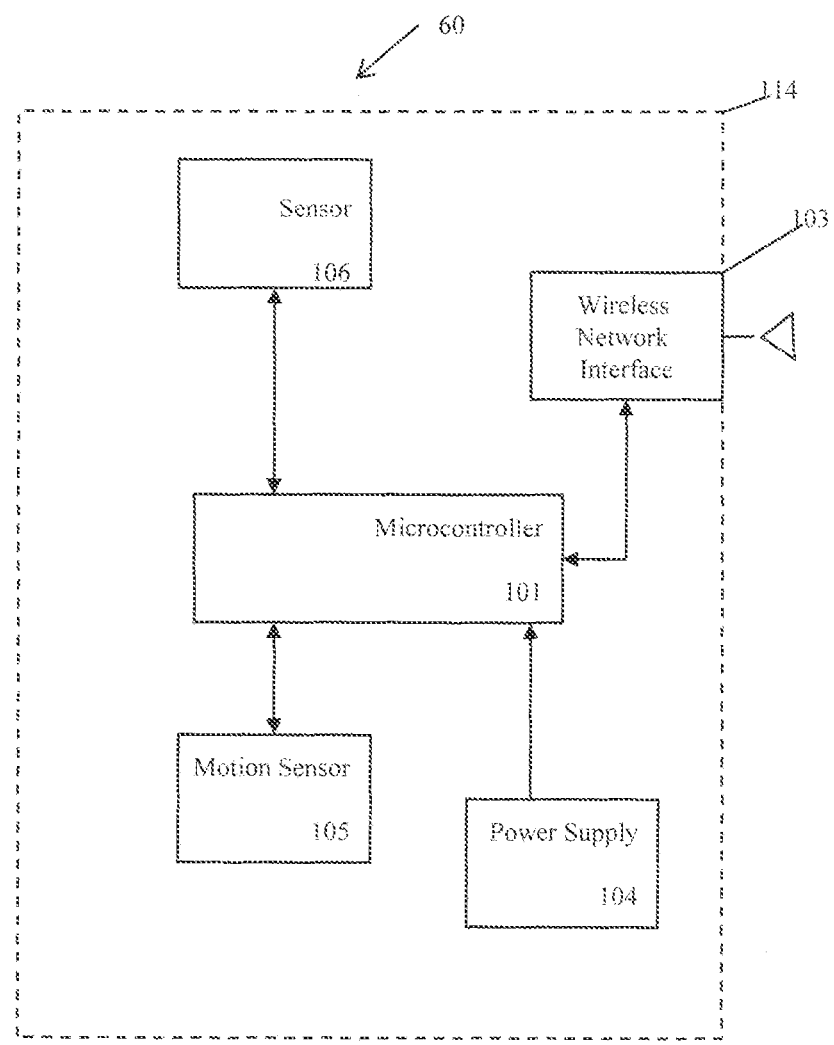
FIG. 4 is a block diagram of a tag.

As shown in FIG. 4, a tag 60, or wireless communication device, preferably includes a microcontroller or processor 101, a wireless network interface 103 having an antenna, a power supply 104, a motion sensor 105 and a sensor 106. The processor 101 is in communication with the sensor 106, motion sensor 105 and wireless network interface 103. The power supply 104 preferably provides power to the processor 101, the motion sensor 104, the sensor 106 and the wireless network interface 103. The power supply 104 is preferably a battery such as a lithium battery. The power supply 104 is preferably the only source of power for the tag 60. Conserving the energy use of the tag 60 allows the tag 60 to have greater use period before needing to be recharged or replaced.

Figure 4A:
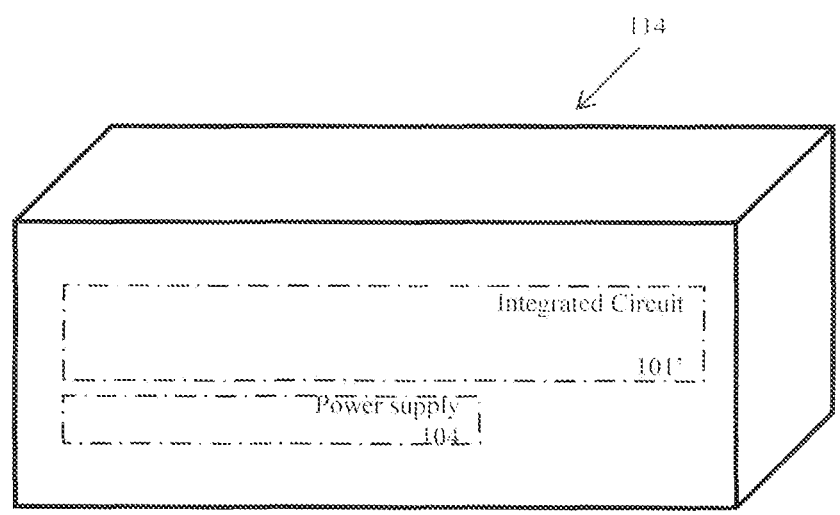
FIG. 4A is a tag with an integrated circuit.
Figure 4B:
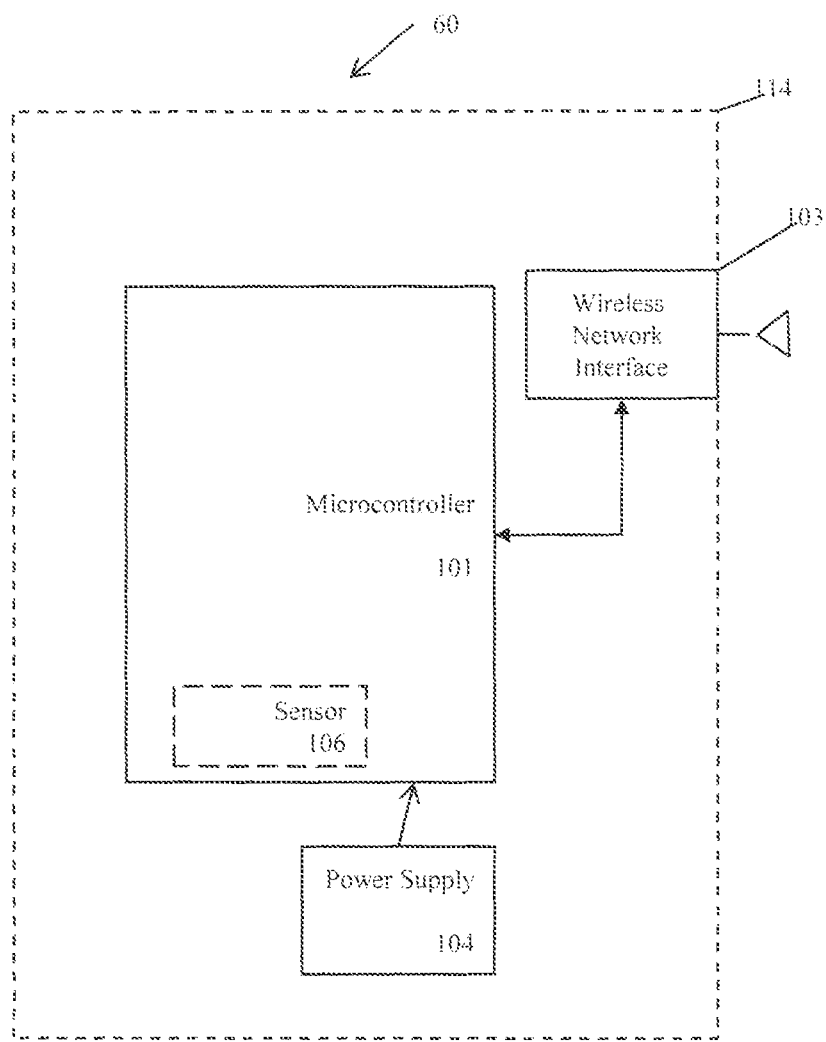
FIG. 4B is a block diagram of an alternative embodiment of a tag with an integrated circuit.

In an alternative embodiment shown in FIG. 4B, the sensor 106 is an integral component of the microcontroller 101.

Preferably the components of the tag are enclosed within a housing 114 indicated by the dashed line. The housing 114 is preferably composed of an extreme temperature resistant and moisture resistant material. A most preferred material is ULTEM polyetherimide resin, available from Sabic. The electrical components of the tag 60 are preferably contained within the housing 114, and the housing 114 is preferably ultrasonically welded. The housing 114 most preferably has dimensions of 1 inch width by 1.6 inches length by 0.5 inch thickness. The housing 114 is preferably pneumatically leak tested to verify the ultrasonic weld. Those skilled in the pertinent art will recognize that the dimensions of the housing 114 may be adapted to a tag for various sterilizable objects without departing from the scope and spirit of the present invention.

As shown in FIG. 4A, the tag 60 has a housing 114 with an integrated circuit 101' and power supply 104 therein. The integrated circuit 101' preferably includes a microcontroller or processor, a wireless network interface having an antenna, a motion sensor, a temperature sensor, and an analog-to-digital converter. In a most preferred embodiment, the electrical components of the tag 60 are on a single integrated circuit, which are available from various commercial sources such as Texas Instruments. The power consumption is lower in a sleep mode than in an active mode. Those skilled in the pertinent art will recognize that other integrated circuits may be used without departing from the scope and spirit of the present invention.

Figure 5:
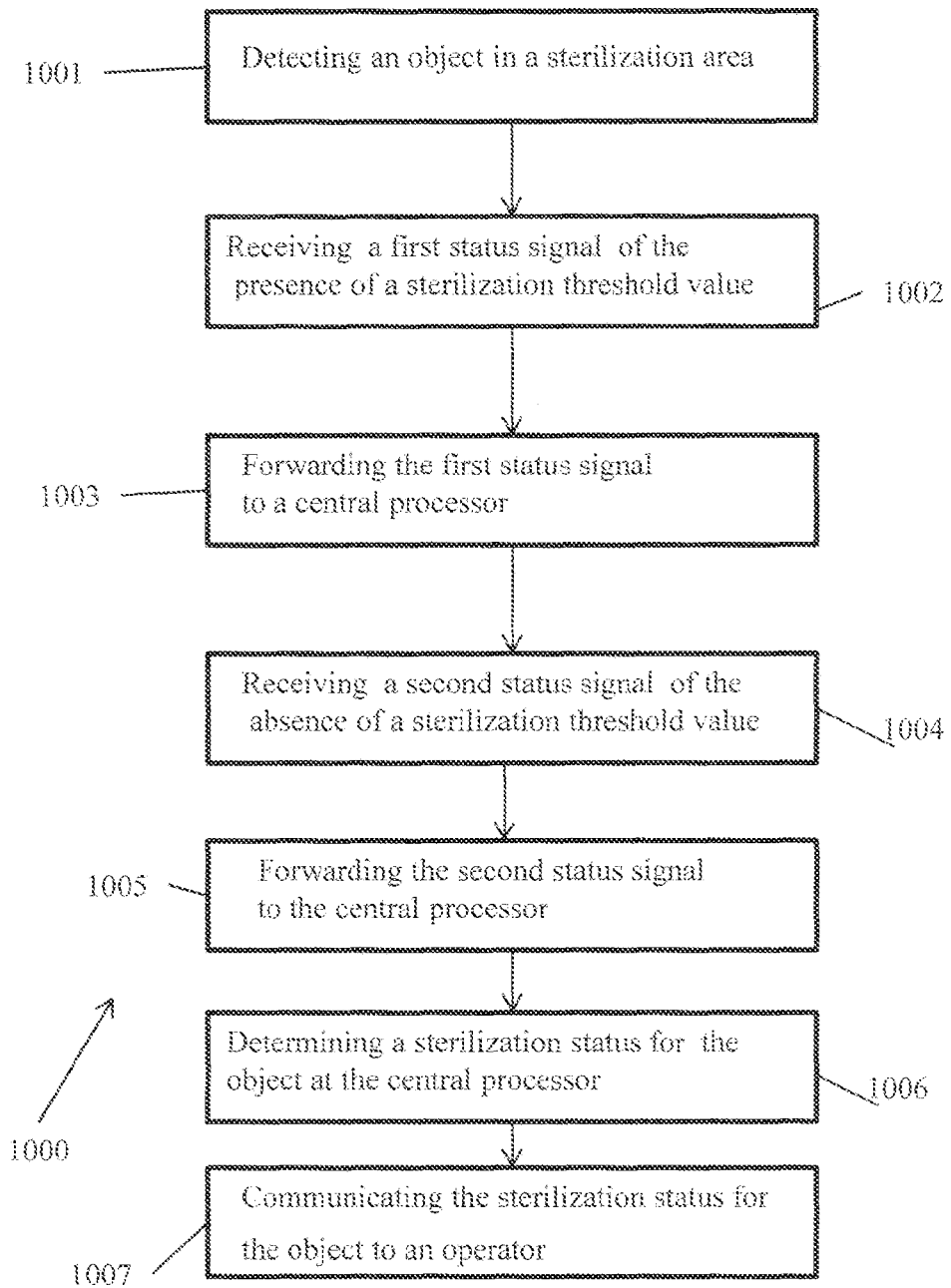
FIG. 5 is a flow chart of a general method for real-time location monitoring of a sterilizable object.

A method 1000 for real-time location monitoring of a sterilizable object is illustrated in FIG. 5. At block 1001, a sterilizable object 100 having a tag 60, or wireless communication device, is tracked in a sterilization area of the facility 70 by at least one sensor 55. The sterilization area is where any or all of cleaning, disinfecting and/or sterilizing a sterilizable object 100 is performed within the facility 70. At block 1002, a first status signal is received by at least one sensor 55 from the tag 60 indicating the presence of a sterilization threshold value. The presence of the sterilization threshold value is indicative of the beginning of a sterilization procedure for the sterilizable object 100. At block 1003, the first status signal is forwarded to a central processor. The first status signal preferably comprises data including time, date, location, object identification, and the sterilization threshold value detected. At block 1004, a second status signal is received by at least one sensor 55 from the tag 60 indicating the absence of the sterilization threshold value. At block 1005, the second status signal is forwarded to the central processor. The absence of the sterilization threshold value is indicative of the end of the sterilization procedure for the sterilizable object 100. The second status signal preferably comprises data including time, date, location, object identification, and a termination of sterilization threshold value message. At block 1006, the central processor determines a sterilization status for the sterilizable object based on at least the first status signal and the second status signal. The central processor calculates the time that the sterilizable object 100 was exposed to the sterilization event and the intensity of the exposure. The calculated values are compared to stored data for prescribed sterilization values to determine if the sterilizable object was properly sterilized. At block 1007, the sterilization status is communicated to an operator. The communication informs the operator if the sterilization procedure was complete or incomplete. The sterilization events are preferably a known sequence of at least one of a series of predefined temperature, a series of predefined locations, an ordered series of predefined locations the absence of a series of predefined temperatures and the absence of predefined locations.

Figure 4C:
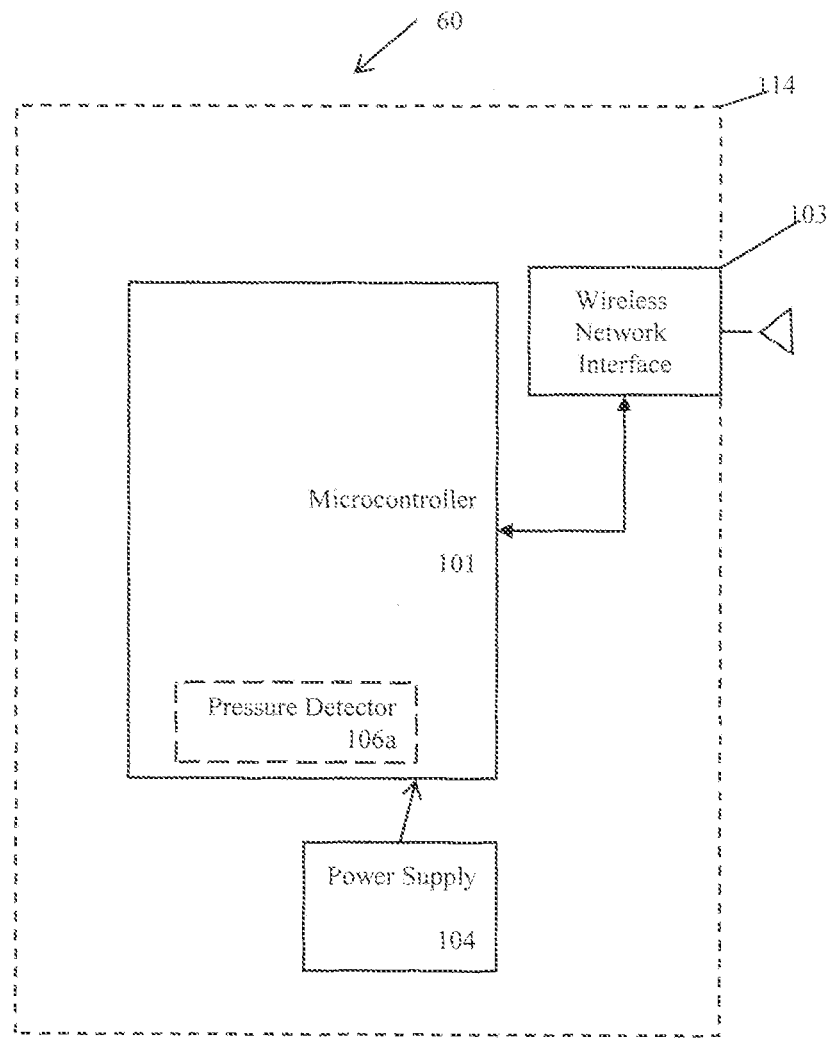
FIG. 4C is a block diagram of an alternative embodiment of a tag with an integrated circuit having a pressure detector.

As shown in FIG. 4C, the sensor is a pressure detector 106a. One particular type of pressure sensor is a piezoresistive OEM pressure transducer. The pressure detector 106a detects a change in environmental pressure, which is a sterilization event transmitted by the microcontroller 101 to the wireless network interface 103 for broadcast to the network sensors 55 for eventual communication to the server 65. Preferably, pressure is utilized with steam sterilization. One such apparatus for sterilizing an object is a pressure cooker, which can provide the necessary steam and pressure for sterilization. A pressure of 1.036 Bar above atmospheric pressure is a preferred minimum pressure value for the threshold value.

Figure 5A:
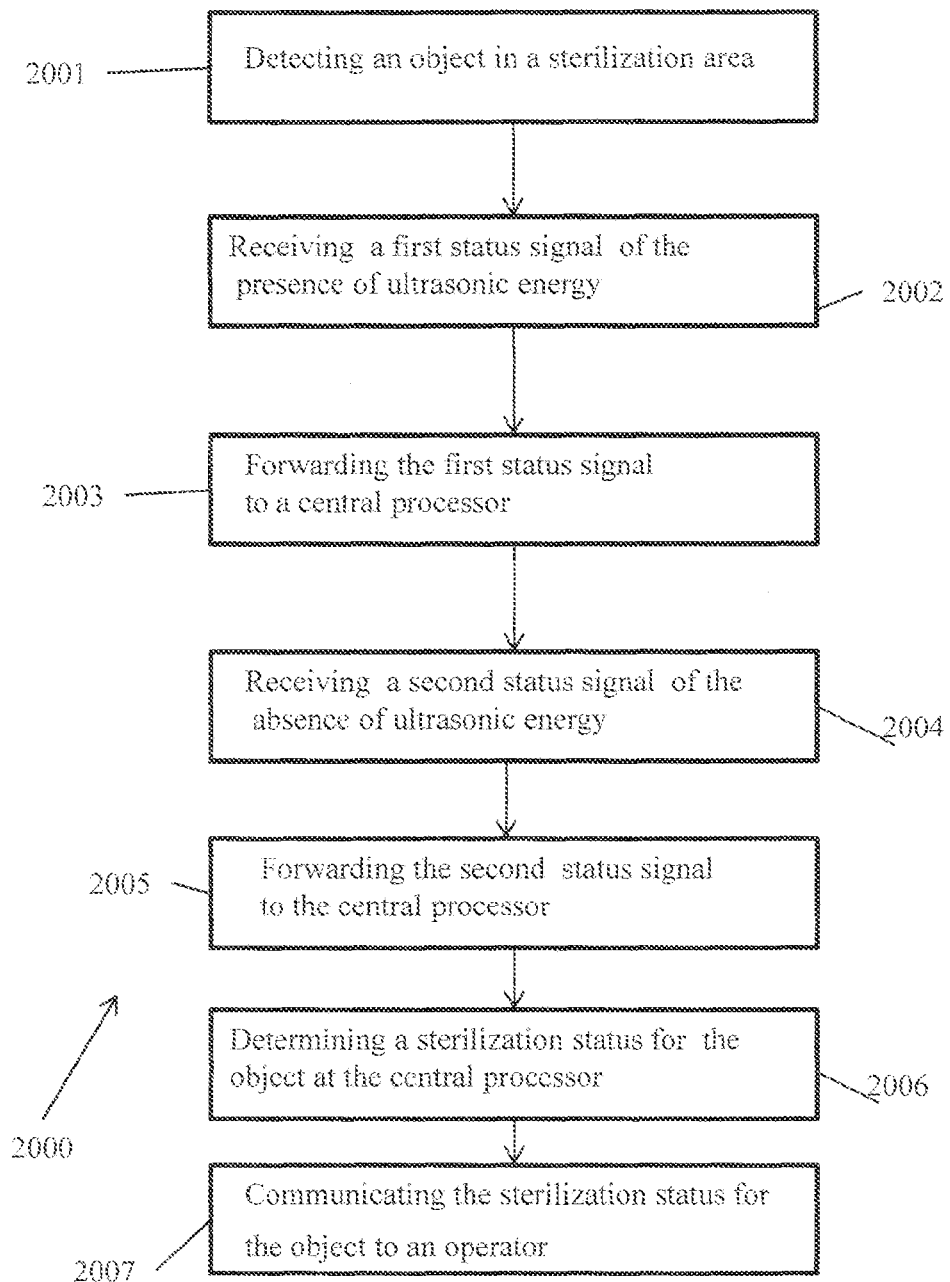
FIG. 5A is a flow chart of a specific method for real-time location monitoring of a sterilizable object utilizing an ultrasonic energy sterilization procedure.
Figure 5B:
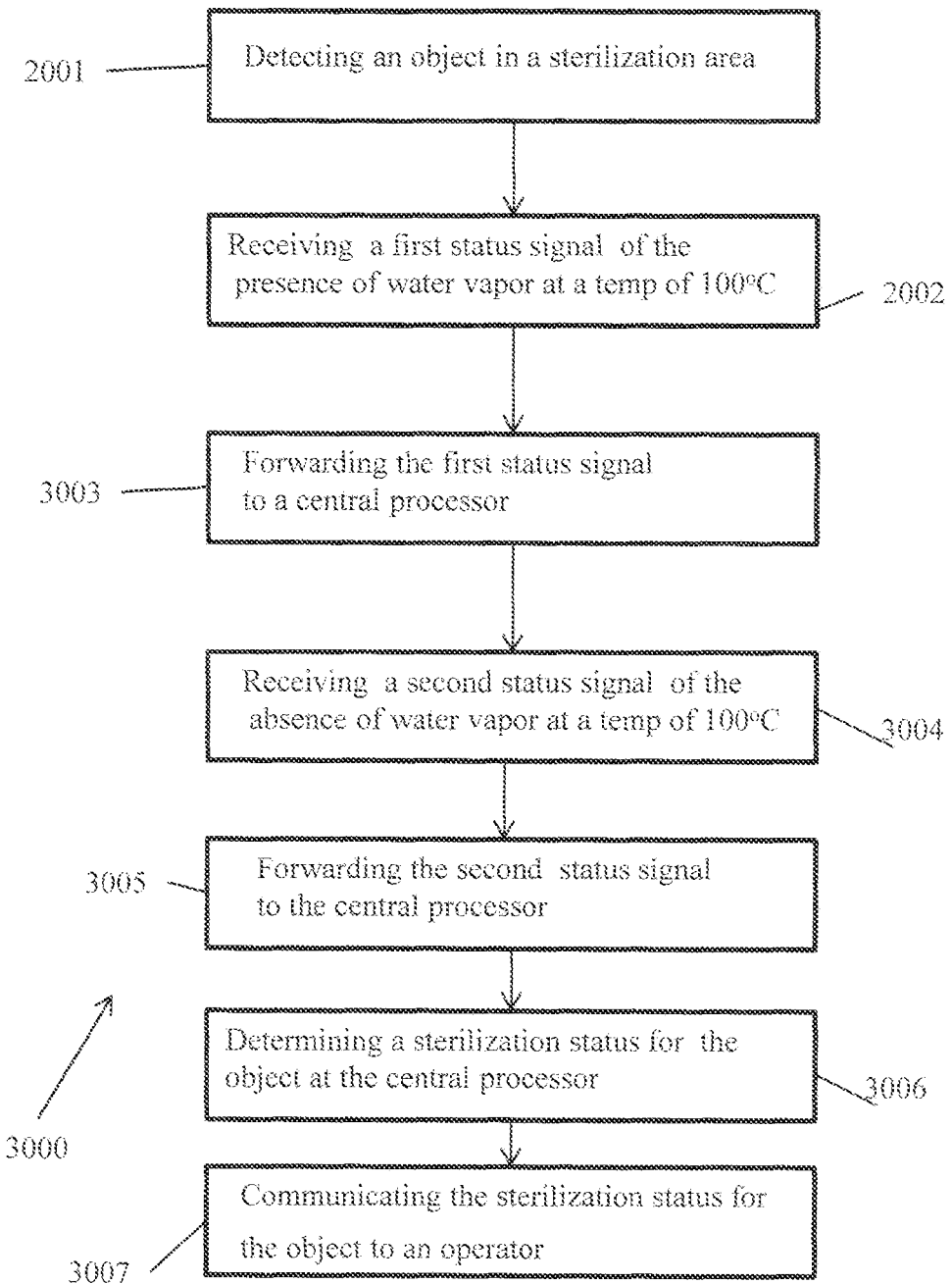
FIG. 5B is a flow chart of a specific method for real-time location monitoring of a sterilizable object utilizing a steam sterilization procedure.
Figure 5C:
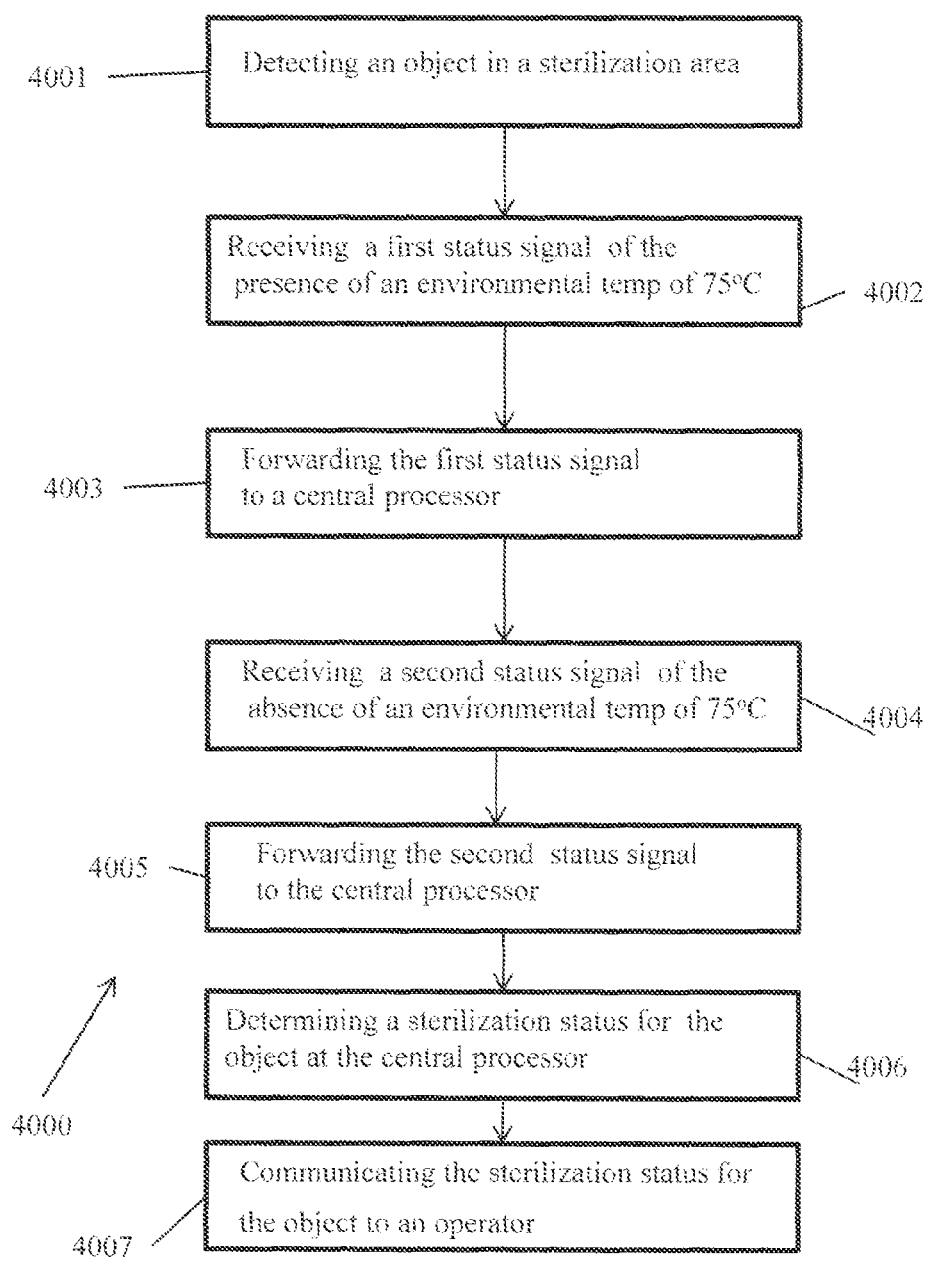
FIG. 5C is a flow chart of a specific method for real-time location monitoring of a sterilizable object utilizing a high temperature sterilization procedure.
Figure 5D:
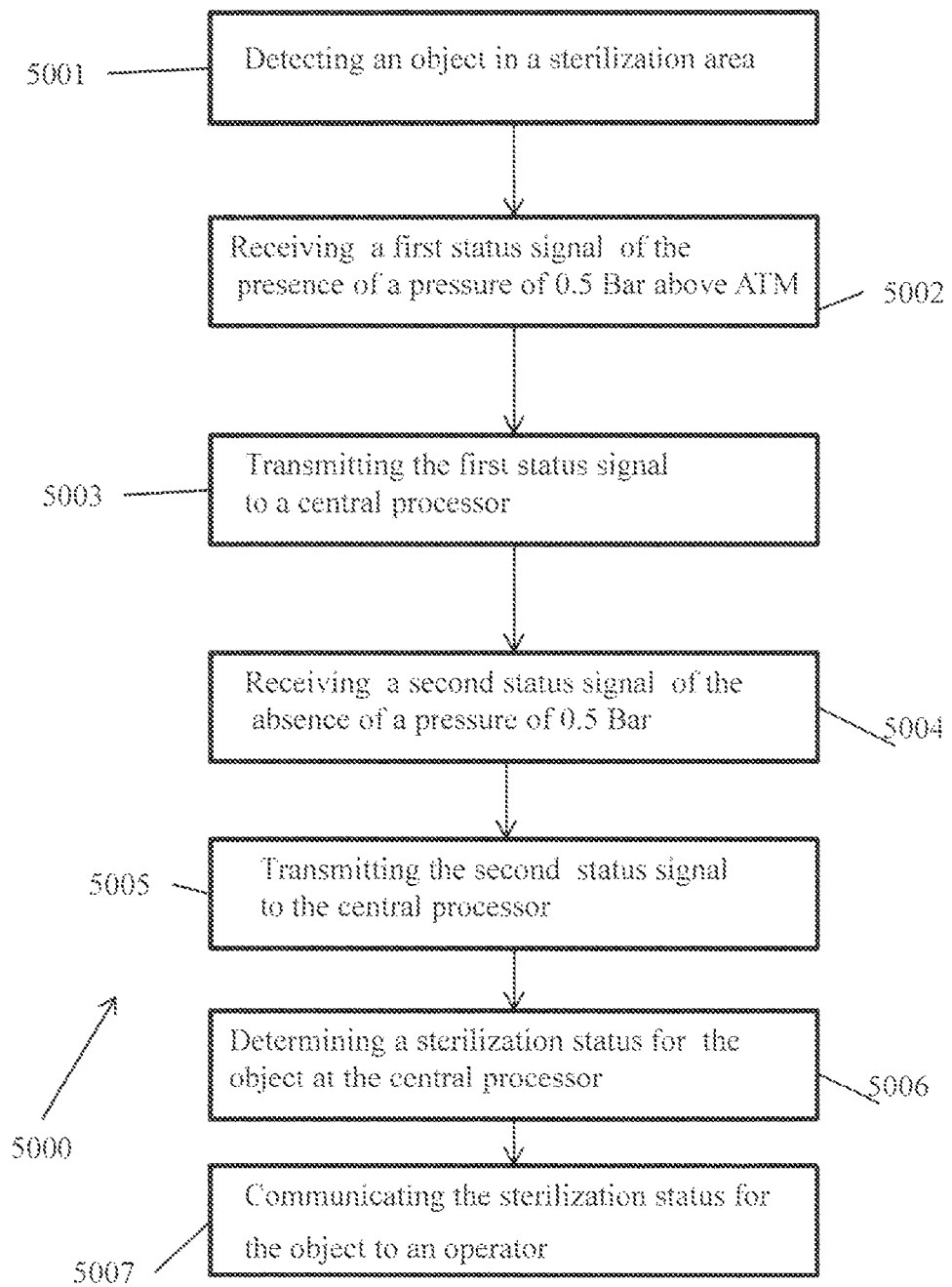
FIG. 5D is a flow chart of a specific method for real-time location monitoring of a sterilizable object utilizing a pressurized environment sterilization procedure.

A specific method 5000 for real-time location monitoring of a sterilizable object is illustrated in FIG. 5D. At block 5001, a sterilizable object 100 having a tag 60 is tracked in a sterilization area of the facility 70 by at least one sensor 55 for sterilization utilizing a pressurized environment. At block 5002, a first status signal is received by at least one sensor 55 from the tag 60 indicating the presence of pressurized environment of at least 0.5 Bar above a standard atmospheric pressure, which is the sterilization threshold value for a sterilization pressure utilizing a pressurized environment. The presence of the sterilization threshold value is indicative of the beginning of a sterilization procedure for the sterilizable object 100. At block 5003, the first status signal is forwarded to a central processor. The first status signal preferably comprises data including time, date, location, object identification, and the sterilization threshold value detected. At block 5004, a second status signal is received by at least one sensor 55 from the tag 60 indicating the absence of the sterilization threshold value. At block 5005, the second status signal is forwarded to the central processor. The absence of the sterilization threshold value is preferably indicative of the end of the sterilization procedure for the sterilizable object 100. Alternatively, the absence of the sterilization threshold value is indicative of a state change in a workflow of the sterilization procedure for the sterilizable object 100. The second status signal preferably comprises data including time, date, location, object identification, association with another object, and/or a termination of sterilization threshold value message. At block 5006, the central processor determines a sterilization status for the sterilizable object based on at least the first status signal and the second status signal. The central processor calculates the time that the sterilizable object 100 was exposed to the sterilization event and the intensity of the exposure. A person skilled in the pertinent art will recognize that that the afore-mentioned calculations could be performed locally on the device or in a distributed manner by a group of devices within a network. The calculated values are compared to stored data for prescribed sterilization values to determine if the sterilizable object was properly sterilized utilizing a sterile process. For example, one sterilization procedure requires steam at a temperature of 121° C. applied at a pressure of 1.036 Bar above atmospheric pressure for twenty minutes for effectiveness. Another sterilization procedure requires steam at a temperature of 134° C. applied at a pressure of 2.026 Bar above atmospheric pressure for four minutes for effectiveness. At block 5007, the sterilization status is communicated to an operator. The communication informs the operator if the sterilization procedure was complete or incomplete.

Figure 4D:
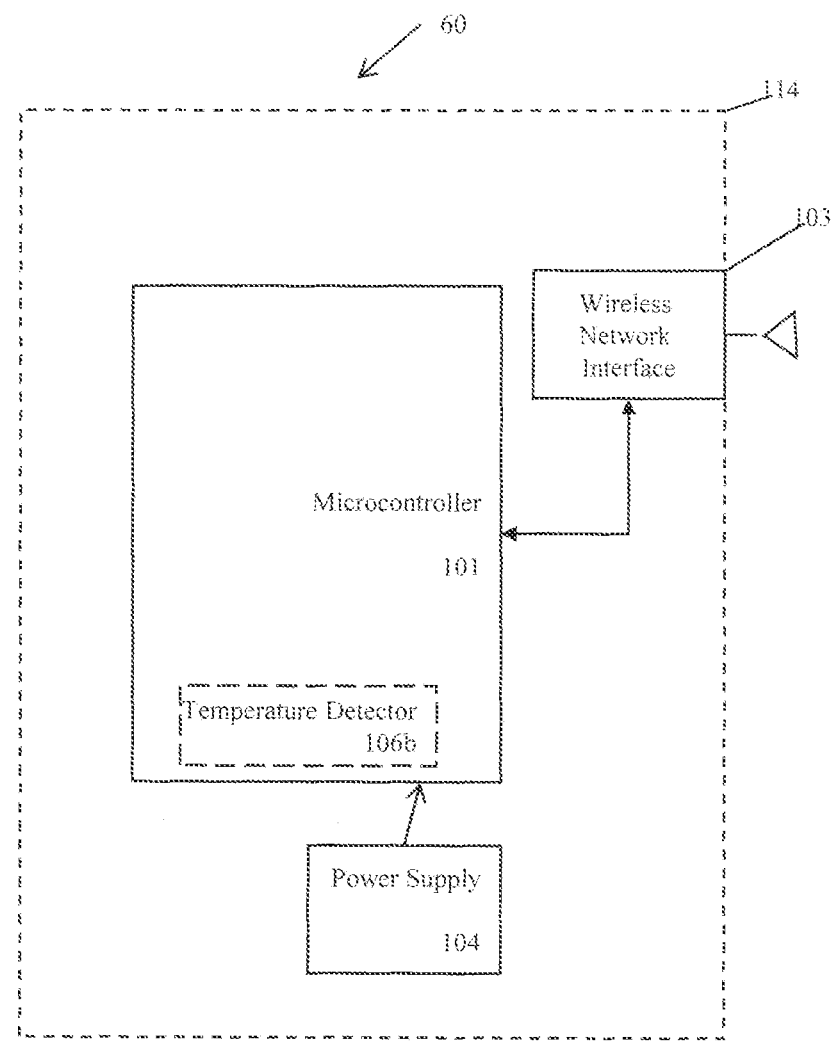
FIG. 4D is a block diagram of an alternative embodiment of a tag with an integrated circuit having a temperature detector.

As shown in FIG. 4D, in alternative embodiment of the tag 60 the sensor is a temperature detector 106b. The temperature detector 106b detects a change in the environmental temperature, which is a sterilization event transmitted by the microcontroller 101 to the wireless network interface 103 for broadcast to the network sensors 55 for eventual communication to the server 65.

Another specific method 4000 for real-time location monitoring of a sterilizable object is illustrated in FIG. 5C. At block 4001, a sterilizable object 100 having a tag 60 is tracked in a sterilization area of the facility 70 by at least one sensor 55 for sterilization utilizing a high temperature environment. At block 4002, a first status signal is received by at least one sensor 55 from the tag 60 indicating the presence of high temperature environment of at least 75° C., which is the sterilization threshold value for a sterilization pressure utilizing a high temperature environment. The presence of the sterilization threshold value is indicative of the beginning of a sterilization procedure for the sterilizable object 100. At block 4003, the first status signal is forwarded to a central processor. The first status signal preferably comprises data including time, date, location, object identification, and the sterilization threshold value detected. At block 4004, a second status signal is received by at least one sensor 55 from the tag 60 indicating the absence of the sterilization threshold value. At block 4005, the second status signal is forwarded to the central processor. The absence of the sterilization threshold value is preferably indicative of the end of the sterilization procedure for the sterilizable object 100. Alternatively, the absence of the sterilization threshold value is indicative of a state change in a workflow of the sterilization procedure for the sterilizable object 100. The second status signal preferably comprises data including time, date, location, object identification, association with another object, and/or a termination of sterilization threshold value message. At block 4006, the central processor determines a sterilization status for the sterilizable object based on at least the first status signal and the second status signal. The central processor calculates the time that the sterilizable object 100 was exposed to the sterilization event and the intensity of the exposure. The calculated values are compared to stored data for prescribed sterilization values to determine if the sterilizable object was properly sterilized utilizing a high temperature environment. For example, one sterilization procedure for dry heat sterilization requires a temperature of 180° C. for thirty minutes for effectiveness. Another sterilization procedure for dry heat sterilization requires a temperature of 141° C. for three hours for effectiveness. At block 4007, the sterilization status is communicated to an operator. The communication informs the operator if the sterilization procedure was complete or incomplete.

Figure 4E:
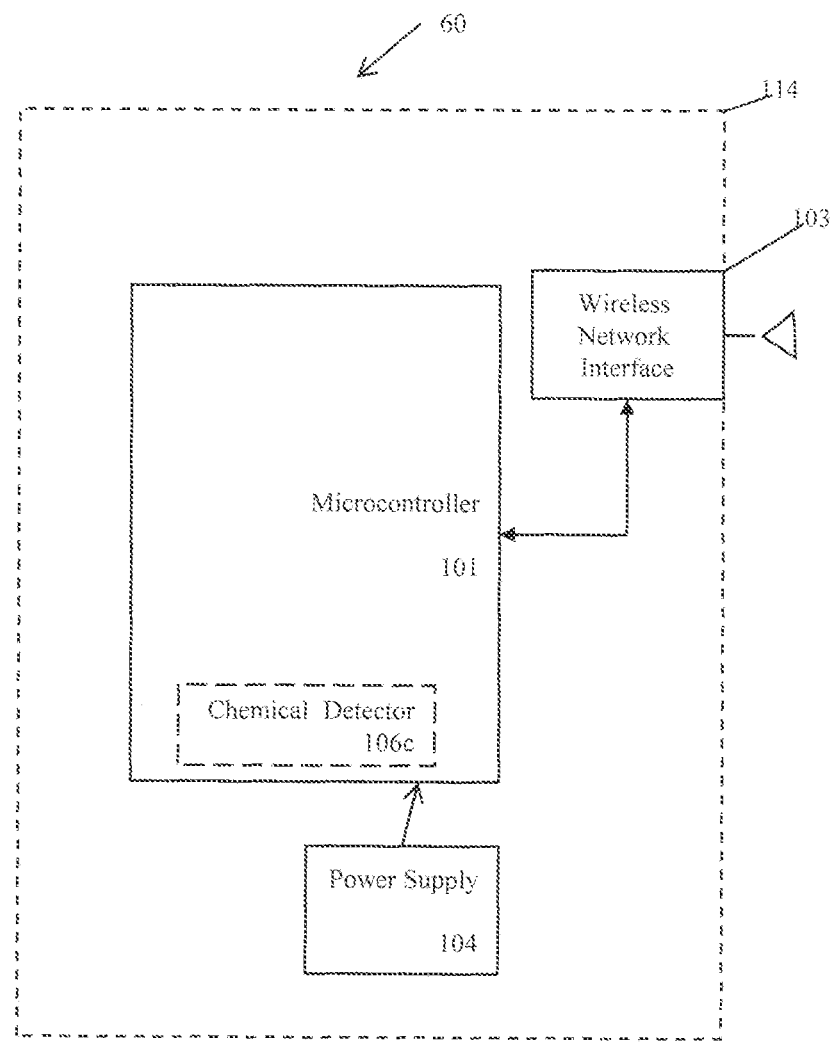
FIG. 4E is a block diagram of an alternative embodiment of a tag with an integrated circuit having a chemical detector.

As shown in FIG. 4E, in alternative embodiment of the tag 60 the sensor is a chemical detector 106c. In this embodiment, the sensor 106c may reside outside of the liquid proof housing. The chemical detector 106c detects a pH change or the presence of a chemical, which is a sterilization event. Alternatively, a chemical detector sensor 106 detects a chemical and transmits a signal to the microcontroller within the housing. The sterilization event is transmitted by the microcontroller 101 to the wireless network interface 103 for broadcast to the network sensors 55 for eventual communication to the server 65.

Figure 5E:
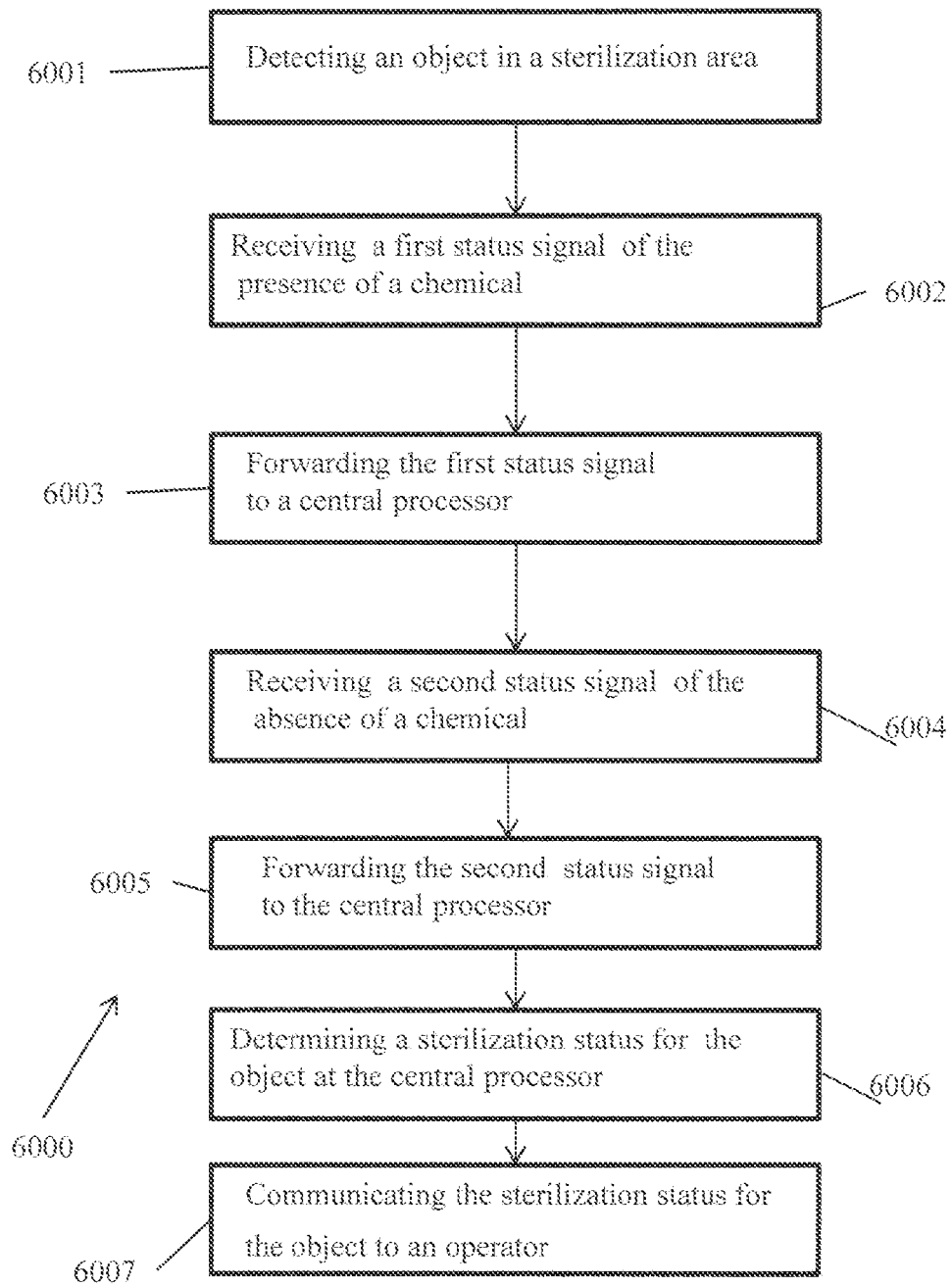
FIG. 5E is a flow chart of a specific method for real-time location monitoring of a sterilizable object utilizing a chemical sterilant sterilization procedure.

Another specific method 6000 for real-time location monitoring of a sterilizable object is illustrated in FIG. 5E. At block 6001, a sterilizable object 100 having a tag 60 is tracked in a sterilization area of the facility 70 by at least one sensor 55 for sterilization utilizing a chemical sterilant. Chemical sterilants are primarily used for heat-labile sterilizable objects 100. The sterilizable objects are sterilized by soaking the sterilizable object 100 in a chemical solution followed by rinsing in sterile water. At block 6002, a first status signal is received by at least one sensor 55 from the tag 60 indicating the presence of a chemical sterilant, which is the sterilization threshold value for a sterilization pressure utilizing a chemical sterilant. The presence of the sterilization threshold value is indicative of the beginning of a sterilization procedure for the sterilizable object 100. At block 6003, the first status signal is forwarded to a central processor. The first status signal preferably comprises data including time, date, location, object identification, and the sterilization threshold value detected. At block 6004, a second status signal is received by at least one sensor 55 from the tag 60 indicating the absence of the sterilization threshold value. At block 6005, the second status signal is forwarded to the central processor. The absence of the sterilization threshold value is preferably indicative of the end of the sterilization procedure for the sterilizable object 100. Alternatively, the absence of the sterilization threshold value is indicative of a state change in a workflow of the sterilization procedure for the sterilizable object 100. The second status signal preferably comprises data including time, date, location, object identification, association with another object, and/or a termination of sterilization threshold value message. At block 6006, the central processor determines a sterilization status for the sterilizable object based on at least the first status signal and the second status signal. The central processor calculates the time that the sterilizable object 100 was exposed to the sterilization event and the intensity of the exposure. The calculated values are compared to stored data for prescribed sterilization values to determine if the sterilizable object was properly sterilized utilizing a chemical sterilant. For example, one chemical sterilant sterilizing procedure requires immersion in a 2% glutaraldehyde solution for twenty minutes for effectiveness. Another chemical sterilant sterilizing procedure requires immersion in a 0.35% peracetic solution for ten minutes for effectiveness. Another chemical sterilant sterilizing procedure requires immersion in a 7.5% hydrogen peroxide solution for twenty minutes for effectiveness. At block 6007, the sterilization status is communicated to an operator. The communication informs the operator if the sterilization procedure was complete or incomplete.

Figure 4F:
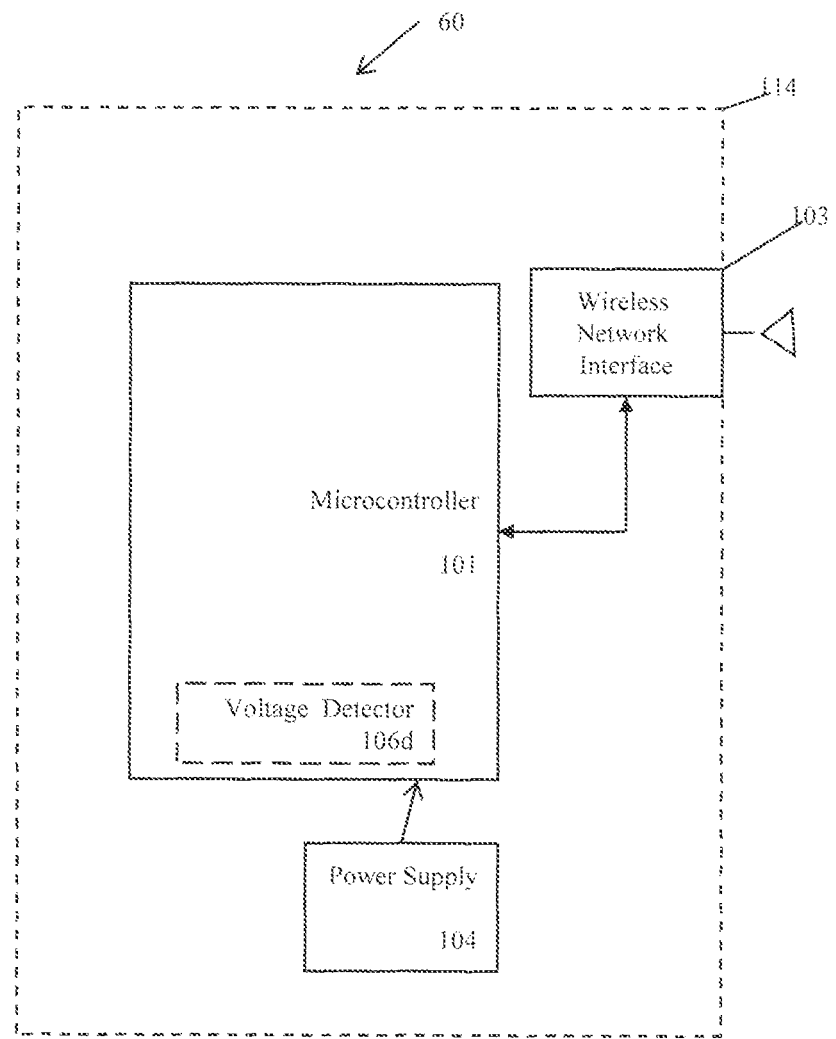
FIG. 4F is a block diagram of an alternative embodiment of a tag with an integrated circuit having a voltage detector.

As shown in FIG. 4F, in alternative embodiment of the tag 60 the sensor is a voltage detector 106d. The voltage detector 106d detects a change in the voltage of the tag 60, which is a sterilization event transmitted by the microcontroller 101 to the wireless network interface 103 for broadcast to the network sensors 55 for eventual communication to the server 65.

Figure 4G:
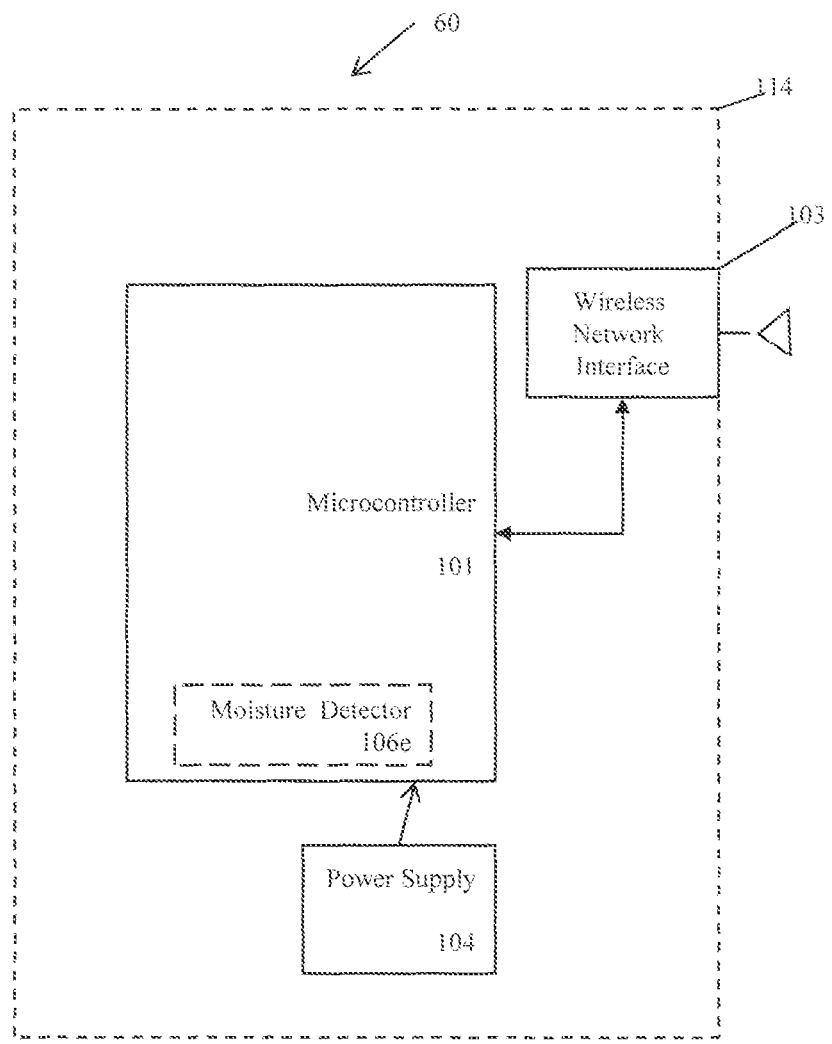
FIG. 4G is a block diagram of an alternative embodiment of a tag with an integrated circuit having a moisture detector.

As shown in FIG. 4G, in alternative embodiment of the tag 60 the sensor is a moisture detector 106e. In this embodiment, the sensor 106e may reside outside of the liquid proof housing. The moisture detector 106e detects the presence of moisture, which is a sterilization event transmitted. Alternatively, a detector 106e detects moisture and transmits a signal to the microcontroller. The sterilization event is transmitted by the microcontroller 101 to the wireless network interface 103 for broadcast to the network sensors 55 for eventual communication to the server 65.

Figure 5F:
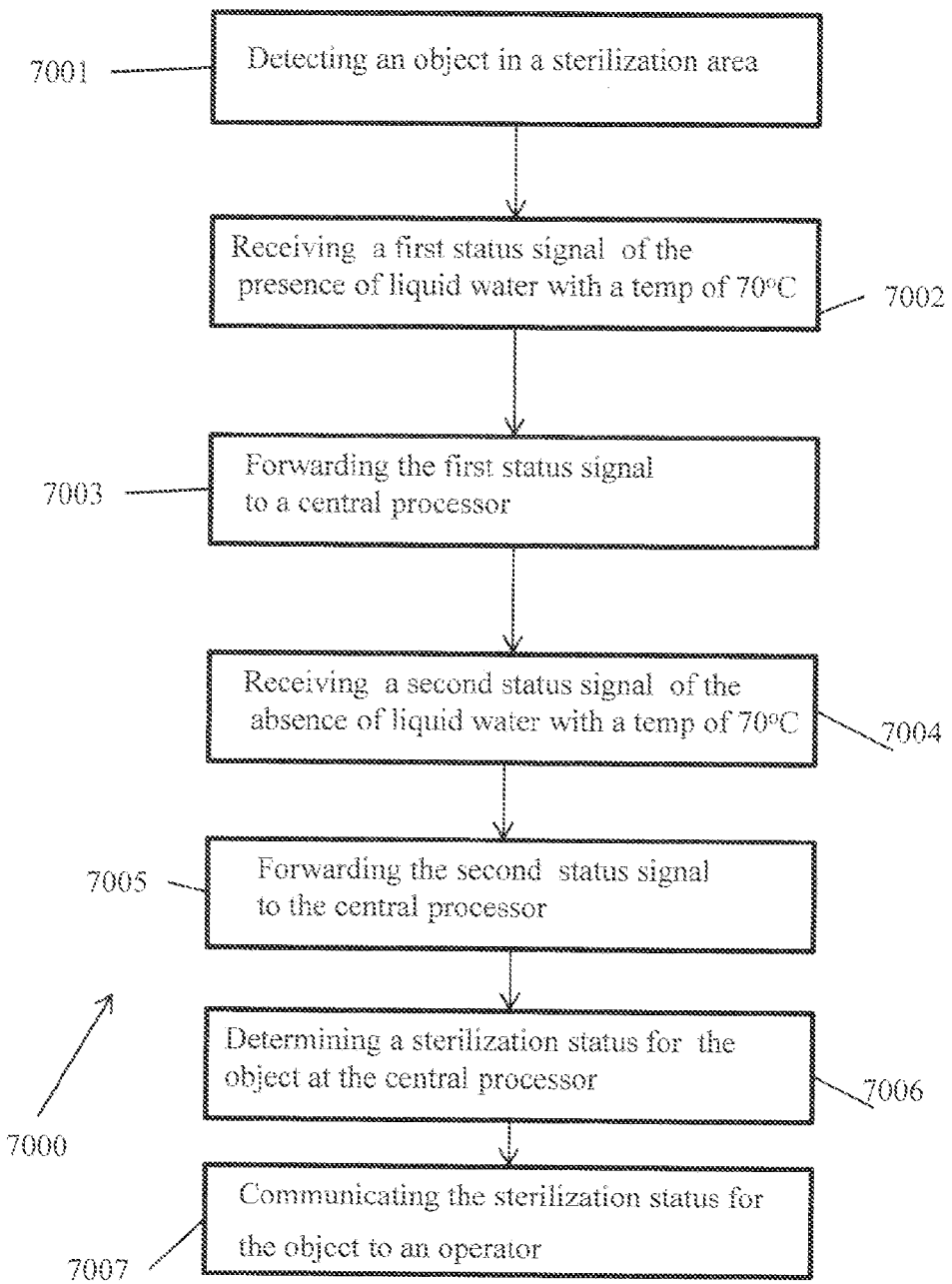
FIG. 5F is a flow chart of a specific method for real-time location monitoring of a sterilizable object utilizing a hot water sterilization procedure.
Figure 6:
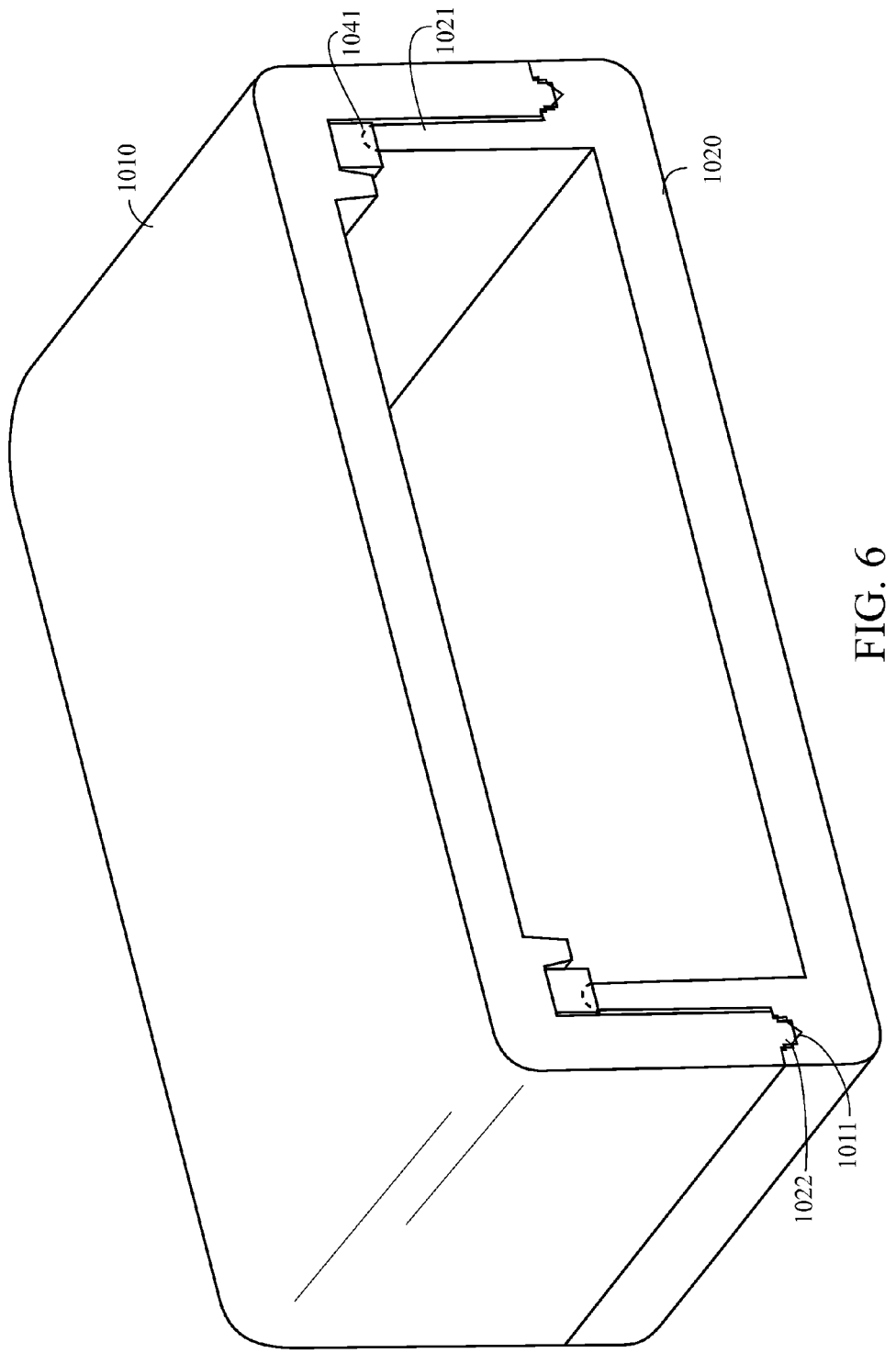
FIG. 6 is a cut-away view of a preferred embodiment of a housing of a sterilizable wireless communication device.
Figure 7:
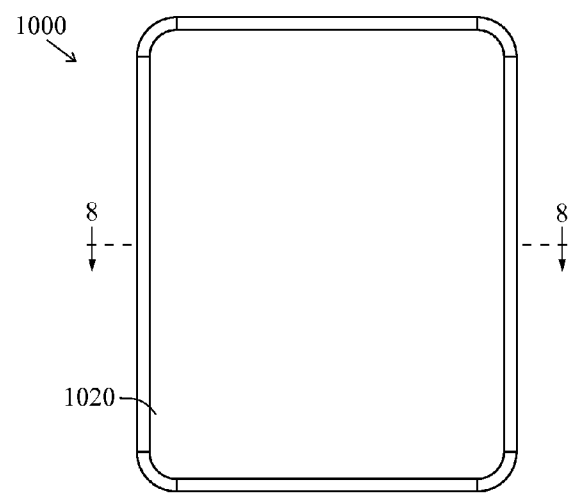
FIG. 7 is a top plan view of a preferred embodiment of a sterilizable wireless communication device.
Figure 8:
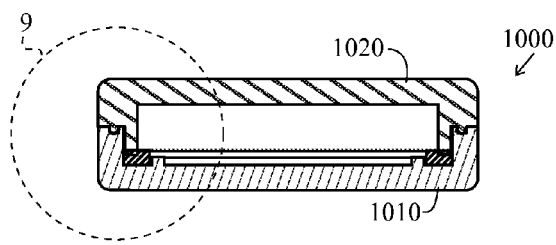
FIG. 8 is a cross-sectional view of along line 8-8 of FIG. 7.
Figure 9:
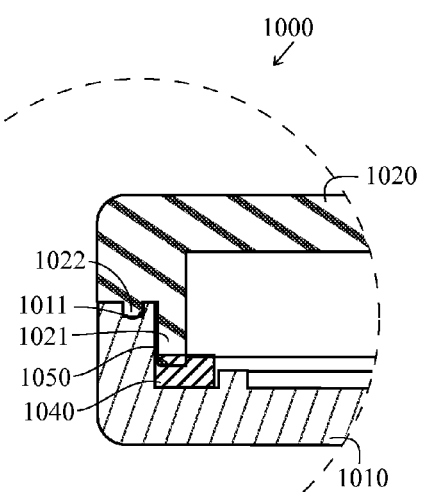
FIG. 9 is an isolated view of circle 9 of FIG. 8.

Another specific method 7000 for real-time location monitoring of a sterilizable object is illustrated in FIG. 5F. At block 7001, a sterilizable object 100 having a tag 60 is tracked in a sterilization area of the facility 70 by at least one sensor 55 for sterilization utilizing a hot water environment. At block 7002, a first status signal is received by at least one sensor 55 from the tag 60 indicating the presence of hot water environment of at least 70° C., which is the sterilization threshold value for a sterilization pressure utilizing a hot water environment. The presence of the sterilization threshold value is indicative of the beginning of a sterilization procedure for the sterilizable object 100. At block 7003, the first status signal is forwarded to a central processor. The first status signal preferably comprises data including time, date, location, object identification, and the sterilization threshold value detected. At block 7004, a second status signal is received by at least one sensor 55 from the tag 60 indicating the absence of the sterilization threshold value. At block 7005, the second status signal is forwarded to the central processor. The absence of the sterilization threshold value is preferably indicative of the end of the sterilization procedure for the sterilizable object 100. Alternatively, the absence of the sterilization threshold value is indicative of a state change in a workflow of the sterilization procedure for the sterilizable object 100. The second status signal preferably comprises data including time, date, location, object identification, association with another object, and/or a termination of sterilization threshold value message. At block 7006, the central processor determines a sterilization status for the sterilizable object based on at least the first status signal and the second status signal. The central processor calculates the time that the sterilizable object 100 was exposed to the sterilization event and the intensity of the exposure. The calculated values are compared to stored data for prescribed sterilization values to determine if the sterilizable object was properly sterilized utilizing a high temperature environment. For example, one sterilization procedure for hot water sterilization requires a temperature of 70° C. for two minutes followed by a hot water rinse at 90° C. for ten seconds and then drying at 75° C. for effectiveness. At block 7007, the sterilization status is communicated to an operator. The communication informs the operator if the sterilization procedure was complete or incomplete.

Another specific method 3000 for real-time location monitoring of a sterilizable object is illustrated in FIG. 5B. At block 3001, a sterilizable object 100 having a tag 60 is tracked in a sterilization area of the facility 70 by at least one sensor 55 for sterilization utilizing a steam environment. At block 3002, a first status signal is received by at least one sensor 55 from the tag 60 indicating the presence of a steam environment of at least 100° C., which is the sterilization threshold value for a sterilization pressure utilizing a steam environment. The presence of the sterilization threshold value is indicative of the beginning of a sterilization procedure for the sterilizable object 100. At block 3003, the first status signal is forwarded to a central processor. The first status signal preferably comprises data including time, date, location, object identification, and the sterilization threshold value detected. At block 3004, a second status signal is received by at least one sensor 55 from the tag 60 indicating the absence of the sterilization threshold value. At block 3005, the second status signal is forwarded to the central processor. The absence of the sterilization threshold value is preferably indicative of the end of the sterilization procedure for the sterilizable object 100. Alternatively, the absence of the sterilization threshold value is indicative of a state change in a workflow of the sterilization procedure for the sterilizable object 100. The second status signal preferably comprises data including time, date, location, object identification, association with another object, and/or a termination of sterilization threshold value message. At block 3006, the central processor determines a sterilization status for the sterilizable object based on at least the first status signal and the second status signal. The central processor calculates the time that the sterilizable object 100 was exposed to the sterilization event and the intensity of the exposure. The calculated values are compared to stored data for prescribed sterilization values to determine if the sterilizable object was properly sterilized utilizing a high temperature environment. For example, one sterilization procedure for steam sterilization requires steam at a temperature of 121° C. for thirty minutes for effectiveness. At block 3007, the sterilization status is communicated to an operator. The communication informs the operator if the sterilization procedure was complete or incomplete.

Figure 4H:
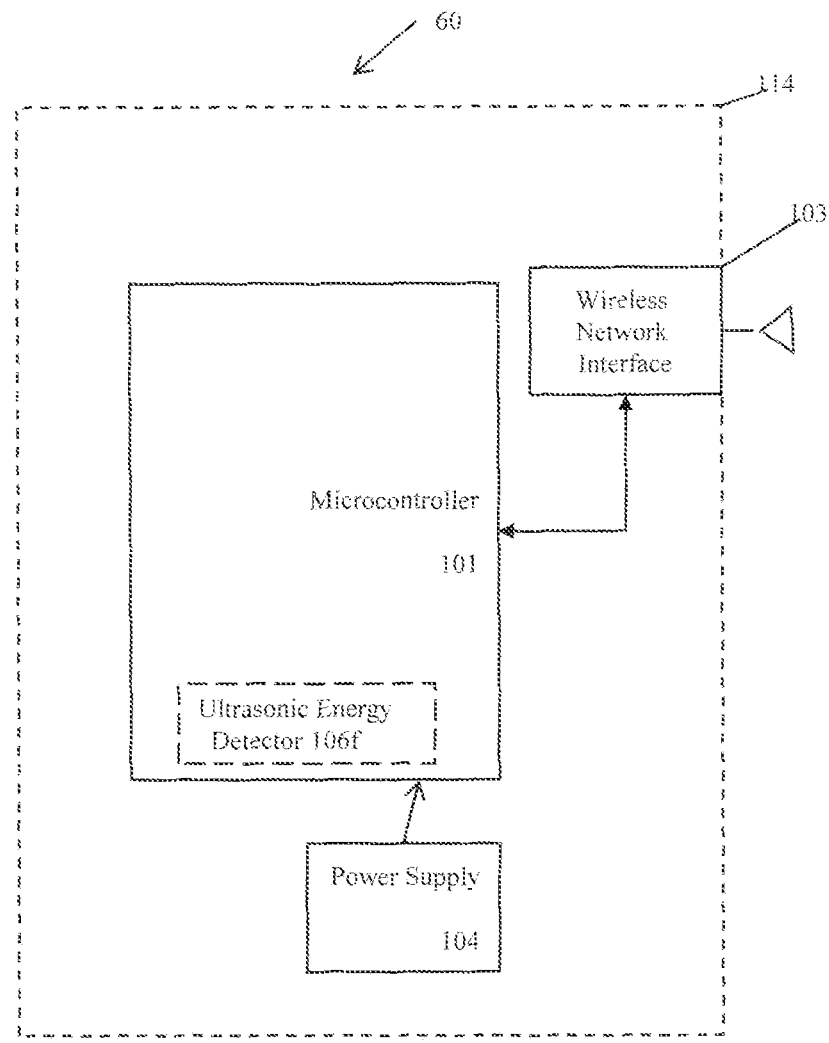
FIG. 4H is a block diagram of an alternative embodiment of a tag with an integrated circuit having an ultrasonic energy detector.

As shown in FIG. 4H, in alternative embodiment of the tag 60 the sensor is an ultrasonic energy detector 106f. The ultrasonic energy detector 106f detects the presence of ultrasonic energy, which is a sterilization event transmitted by the microcontroller 101 to the wireless network interface 103 for broadcast to the network sensors 55 for eventual communication to the server 65.

Another specific method 2000 for real-time location monitoring of a sterilizable object is illustrated in FIG. 5A. At block 2001, a sterilizable object 100 having a tag 60 is tracked in a sterilization area of the facility 70 by at least one sensor 55 for sterilization utilizing ultrasonic energy. At block 2002, a first status signal is received by at least one sensor 55 from the tag 60 indicating the presence of ultrasonic energy, greater than 20,000 Hertz, which is the sterilization threshold value for a sterilization pressure utilizing ultrasonic energy. The presence of the sterilization threshold value is indicative of the beginning of a sterilization procedure for the sterilizable object 100. At block 2003, the first status signal is forwarded to a central processor. The first status signal preferably comprises data including time, date, location, object identification, and the sterilization threshold value detected. At block 2004, a second status signal is received by at least one sensor 55 from the tag 60 indicating the absence of the sterilization threshold value. At block 2005, the second status signal is forwarded to the central processor. The absence of the sterilization threshold value is preferably indicative of the end of the sterilization procedure for the sterilizable object 100. Alternatively, the absence of the sterilization threshold value is indicative of a state change in a workflow of the sterilization procedure for the sterilizable object 100. The second status signal preferably comprises data including time, date, location, object identification, association with another object, and/or a termination of sterilization threshold value message. At block 2006, the central processor determines a sterilization status for the sterilizable object based on at least the first status signal and the second status signal. The central processor calculates the time that the sterilizable object 100 was exposed to the sterilization event and the intensity of the exposure. The calculated values are compared to stored data for prescribed sterilization values to determine if the sterilizable object was properly sterilized utilizing ultrasonic energy. The communication informs the operator if the sterilization procedure was complete or incomplete.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A wireless communication device comprising:
    a circuit board with a coating;
    a top housing having an upper wall and a side wall connected to the upper wall, the side wall having an extension and a protrusion extending downward;
    a bottom housing for engagement with the top housing, the bottom housing having a lower wall and a side wall connected to lower wall, the side wall having a slot; and
    a gasket with a designed interference for sealing a chamber defined by the top housing and the bottom housing;
    wherein the circuit board is positioned within the chamber;
    wherein the extension of the side wall of the top housing is positioned in the slot of the side wall of the bottom housing;
    wherein the protrusion of the top housing, and the side wall of the bottom housing form a trap to prevent the passage of at least one of a liquid and a vapor into the chamber.

2. The wireless communication device according to claim 1 wherein the circuit board comprises a transceiver and a processor.

3. The wireless communication device according to claim 1 wherein the top housing and the bottom housing are ultrasonic welded together to create a melt front on at least three surfaces for a liquid tight enclosure.

4. The wireless communication device according to claim 1 wherein the circuit board comprises a radiofrequency transmitter operating a low frequency communication protocol.

5. The wireless communication device according to claim 1 wherein radiofrequency transmitter operating a ZIGBEE communication protocol.

6. The wireless communication device according to claim 1 further comprising a battery positioned within the chamber.

7. The wireless communication device according to claim 1 wherein the wireless communication device is a water-tight enclosure.

8. The wireless communication device according to claim 1 wherein the coating of the circuit board is at least one of a paralyne coating, a silicone coating, an acrylic coating or a rubber coating.

9. The wireless communication device according to claim 1 wherein the housing is composed of at least one of an amorphous thermoplastic polyetherimide, an acrylonitrile butadiene styrene material, or a polycarbonate material.

10. The wireless communication device according to claim 1 wherein the gasket is composed of at least one of silicone, acrylic, a thermoplastic elastomer or rubber.

11. A method for forming a water-proof wireless communication device, the method comprising:
    coating a circuit board with a coating material to form a coated circuit board;
    placing a gasket around the coated circuit board;
    placing the coated circuit board and gasket in a bottom housing;
    mating a top housing with the bottom housing; and
    ultrasonically welding the top housing with the bottom housing to form a water-proof wireless communication device;
    wherein an extension of the side wall of the top housing is positioned in a slot of a side wall of the bottom housing;
    wherein a protrusion of the top housing, the gasket and the side wall of the bottom housing form a trap to prevent the passage of at least one of a liquid and a vapor into a chamber formed by the top housing and the bottom housing.

12. The method according to claim 11 wherein the circuit board comprises a transceiver and a processor.

13. The method according to claim 11 wherein the gasket is composed of at least one of silicone, acrylic, a thermoplastic elastomer or rubber.

14. The method according to claim 11 wherein the circuit board comprises a radiofrequency transmitter operating a low frequency communication protocol.

15. The method according to claim 11 wherein radiofrequency transmitter operating a ZIGBEE communication protocol.

16. The method according to claim 11 further comprising a battery.

17. The method according to claim 11 wherein the gasket has an interference for sealing an interior chamber defined by the top housing and the bottom housing.

18. The method according to claim 11 wherein the coating of the circuit board is at least one of a paralyne coating, a silicone coating, an acrylic coating or a rubber coating.

19. The method according to claim 11 wherein the housing is composed of at least one of an amorphous thermoplastic polyetherimide, an acrylonitrile butadiene styrene material, or a polycarbonate material.

* * * * *